United States Patent [19]

Mayhew et al.

[11] Patent Number: 4,605,332
[45] Date of Patent: Aug. 12, 1986

[54] UNIVERSAL JOINT GUARD

[75] Inventors: Roger D. Mayhew, Fredonia; B. Bennett Reak, West Bend, both of Wis.

[73] Assignee: Weasler Engineering, Inc., West Bend, Wis.

[21] Appl. No.: 722,340

[22] Filed: Apr. 12, 1985

[51] Int. Cl.$^4$ .......................... F16B 11/00; F16C 1/26
[52] U.S. Cl. ......................................... 403/23; 403/50;
403/58; 464/171; 464/173
[58] Field of Search .................. 403/50, 51, 57, 58,
403/134, 23; 464/171, 173, 172, 117, 118;
74/18.1, 18, 18.2

[56] References Cited

U.S. PATENT DOCUMENTS

| | | | |
|---|---|---|---|
| 919,651 | 4/1909 | Spicer | 403/58 |
| 1,410,791 | 3/1922 | Banks | 464/171 |
| 1,871,883 | 8/1932 | Geyer | 403/51 |
| 1,979,768 | 11/1934 | Pearce | 464/173 |
| 2,106,672 | 1/1938 | Wollner | 64/21 |
| 2,133,176 | 10/1938 | Parent | 64/17 |
| 2,255,172 | 9/1941 | Johnson | 403/50 |
| 2,574,226 | 11/1951 | Sampson | 64/21 |
| 2,924,954 | 2/1960 | Panhard | 64/9 |
| 3,357,206 | 12/1967 | Christie | 64/6 |
| 3,418,828 | 12/1968 | Carns | 64/32 |
| 3,462,975 | 8/1969 | Skromme et al. | 64/32 |
| 3,498,082 | 3/1970 | Geisthoff et al. | 64/32 |
| 3,504,508 | 4/1970 | Bornzin | 64/3 |
| 3,747,368 | 7/1973 | Morin | 64/21 |

FOREIGN PATENT DOCUMENTS

| | | |
|---|---|---|
| 228059 | 11/1910 | Fed. Rep. of Germany . |
| 1102501 | 11/1961 | Fed. Rep. of Germany . |
| 996629 | 9/1951 | France . |
| 1205471 | 4/1958 | France ............... 464/173 |
| 1306079 | 2/1973 | United Kingdom ........... 403/58 |

OTHER PUBLICATIONS

Engineering drawing of Weasler Engineering, Inc., P.O. Box 558, West Bend, WI 53095, admitted prior art, (Applicant's Exhibit N).

Primary Examiner—Cornelius J. Husar
Assistant Examiner—Peter M. Cuomo
Attorney, Agent, or Firm—Quarles & Brady

[57] ABSTRACT

A guard for a universal joint of the type having a yoke pivotally connected by a cross-link to a housing is disclosed. The guard includes a bell element which has a hemispherically shaped outer surface and is mounted coaxially with the yoke. A boot having first and second end portions and a central portion surrounds the housing with the first end portion having a hemispherically shaped inner surface which mates in sliding contact with the hemispherically shaped surface of the bell element. A bearing surface is within the central portion of the boot and the second end portion is opposite from the first end portion. The bearing surface within the central portion is in sliding contact with a spherical surface which is provided on the housing. As the yoke is articulated relative to the housing, the bearing surface slides along the housing spherical surface to allow the boot to tilt relative to the housing.

2 Claims, 4 Drawing Figures

UNIVERSAL JOINT GUARD

BACKGROUND OF THE INVENTION

The present invention relates to a guard for a universal joint.

Universal joints have found wide application to couple rotary shafts that have an angular misalignment. For example, a double universal joint is often used to couple the power take-off shaft of a mobile prime mover such as a tractor to the power input shaft of an attached implement. Since the implement can pivot relative to the prime mover, the drive line from the prime mover to the implement must also be pivotal. The universal joint provides such an articulated coupling between the power take-off and power input shafts.

The dangers of exposed universal joints in drive lines of the type described have been recognized. Guards for universal joints are therefore also well known. Prior art guards are usually provided in two halves. One half of the guard is usually fixed or journaled upon a rotating member of the drive line and the other half is stationary, being fixed to either the prime mover or to the implement. Due to the limited amount of space that is available for the stationary guard on the prime mover or the implement, the rotating guard often interferes with the stationary guard when there is a wide angle between the drive and driven shafts. To avoid this interference, users commonly remove the guard on the prime mover or implement. This results in portions of the rotating universal joint being exposed.

SUMMARY OF THE INVENTION

The invention provides a guard for a universal joint of the type having a yoke pivotally connected by a cross-link to a housing. The guard includes a bell element which has a hemispherically shaped outer surface and is mounted co-axially with the yoke. A boot having first and second end portions and a central portion surrounds the housing. The first end portion has a hemispherically shaped inner surface which mates in sliding contact with the hemispherically shaped outer surface of the bell element. A bearing surface is within the central portion and the second end portion is opposite from the first end portion. The bearing surface within the central portion is in sliding contact with a spherical surface which is provided on the housing. As the yoke is articulated relative to the housing, the bearing surface slides along the housing spherical surface to allow the boot to tilt relative to the housing. This arrangement results in the guard being operable at wide angles in a very limited space.

In the preferred embodiment, the spherical surface of the housing is approximately centered longitudinally with respect to the housing so that the boot tilts approximately about the center of the housing. This results in the guard being operable in little more space than would be required for an unguarded joint.

In another aspect of the invention, the hemispherical surfaces of the bell element and boot have a common center spaced outward of the intersection of the axes of the cross-link along the axis of the yoke. This spacing provides sufficient overlap between the boot and bell element to secure the boot longitudinally with respect to the bell element and to allow a wide angle of articulation between the yoke and the housing. In this aspect, the bearing surface can be made cylindrical to allow the boot to shift longitudinally as the joint is articulated.

In the preferred form, the central portion of the boot defines a circumferential inner groove in which an annular bearing having the bearing surface is disposed. This enables the bearing to be made of a wear resistant material and the boot to be formed from an impact resistant material. The inner groove may be provided with a circumferential corrugation and the annular bearing with an outer rib disposed in the corrugation to hold the bearing axially within the groove.

It is a primary object of the invention to provide a guard for a universal joint which can be operated within a small space.

It is another object of the invention to provide a guard for a universal joint which can be operated at wide angles within a small space.

It is another object of the invention to provide a guard for a universal joint to be used in connection with a stationary guard provided on a tractor or other implement.

It is another object of the invention to provide a universal joint guard which is easy and inexpensive to manufacture.

These and other objects and advantages of the invention will become apparent from the following detailed description and from the drawings.

DETAILED DESCRIPTION OF THE PREFERRED EMBODIMENT

Figure 1:
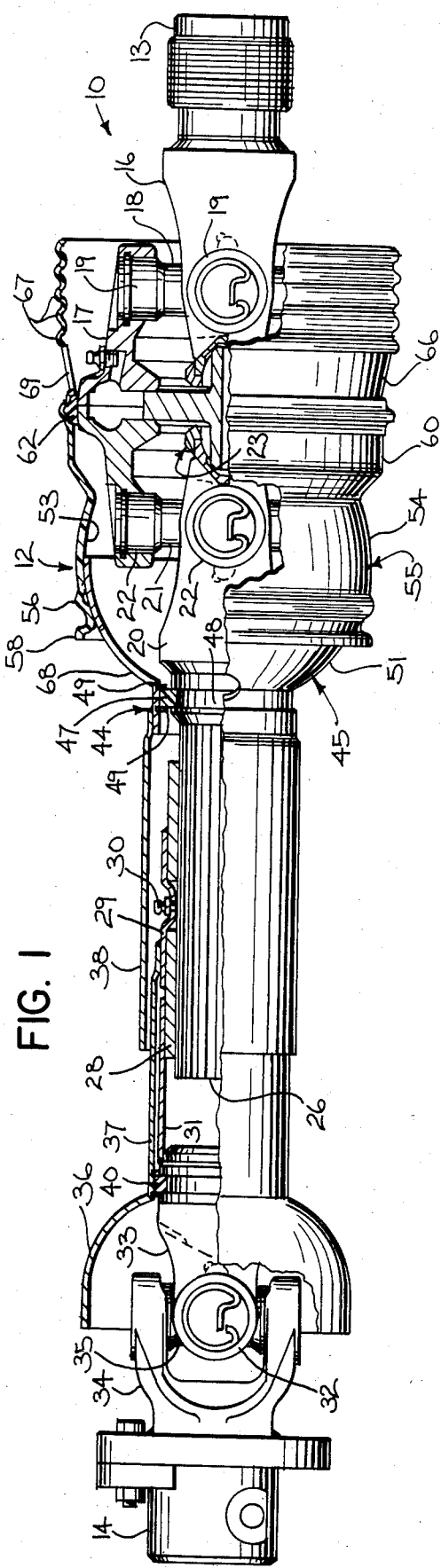
FIG. 1 is a view partially in section showing a shielded drive line for connecting a tractor's power take-off shaft to the power input shaft of an implement and which includes a guard of the present invention.

Referring to FIG. 1, a telescoping drive line 10 for connecting a tractor to a mobile implement is shown. The drive line 10 includes a guard 12 made in accordance with the invention. The guard 12 is provided adjacent to an end 13 which could be connected to the power output shaft of the tractor. The other end 14 of the drive line 10 is adapted to be connected to the power input shaft of the implement.

A yoke 16 is connected to the end 13 and is pivotally connected with suitable bearings 19 to a double inner housing 17 by a cross-link 18 having orthogonal intersecting axes into and parallel to the plane of the drawing, respectively. Another yoke 20 is pivotally connected to the opposite end of the housing 17 by an identical cross-link 21 and bearings 22. The yokes 16 and 20 are connected between the cross-links 18 and 21 by a centering apparatus 23. Since a guard of the present invention could be applied to many different types of universal joints, it is not necessary to explain all of the details of the universal joint shown with the guard 12. However, a universal joint similar to the universal joint shown is fully described in co-pending U.S. patent application Ser. No. 679,814, filed Dec. 10, 1984 for "Centering Apparatus For Constant Velocity Universal Joint."

An externally splined shaft 26 is welded to the yoke 20 and is received within an internally splined sleeve 28 to provide a telescoping connection between the shaft 26 and the sleeve 28. A sleeve 29 having a grease fitting 30 is welded to the sleeve 28 and a sleeve 31 is welded between the sleeve 28 and a yoke 33. The yoke 33 is pivotally connected to another yoke 34 by a cross-link 35 and bearings 32. The yoke 34 is connected to the end 14.

In addition to the guard 12, the shielding for the telescoping drive line includes a cup element 36, an inner sleeve 37 and an outer sleeve 38. The cup element 36 surrounds the yoke 33 and is journaled on the yoke 33 by a bearing 40. The sleeve 37 is fixed to or integral with the cup element 36 and extends over the sleeve 31. The end of the sleeve 37 opposite from the cup element 36 is formed to closely receive the sleeve 29 but is not fixed to the sleeve 29. This, together with the bearing 40, allows the cup element 36 and sleeve 37 to rotate relative to the drive line 10 if someone would bump it. However, the cup element 36 and sleeve 37 would normally rotate with the drive line 10.

The sleeve 38 overlaps the sleeve 37 in sliding relation and is welded at 44 to a bell element 45 which is a portion of the guard 12. The bell element 45 is journaled on and coaxial with the yoke 20 by a bearing 47. The bearing 47 is received within a groove 48 of the yoke 20 and is secured axially relative to the bell element 45 by a pair of snap rings 49. Although the sleeve 38 helps stabilize the bell element 45, the outer end of the bell element could be configured to more closely receive the shaft 26 thereby obviating the need to be stabilized by the sleeve 38. Also, although the cup element 36, the sleeves 37 and 38 and the bell element 45 shown in the embodiment of FIG. 1 are made of metal and are therefore weldable to one another, they could be made of plastic and could be friction welded or otherwise fixed to one another.

Figure 2:
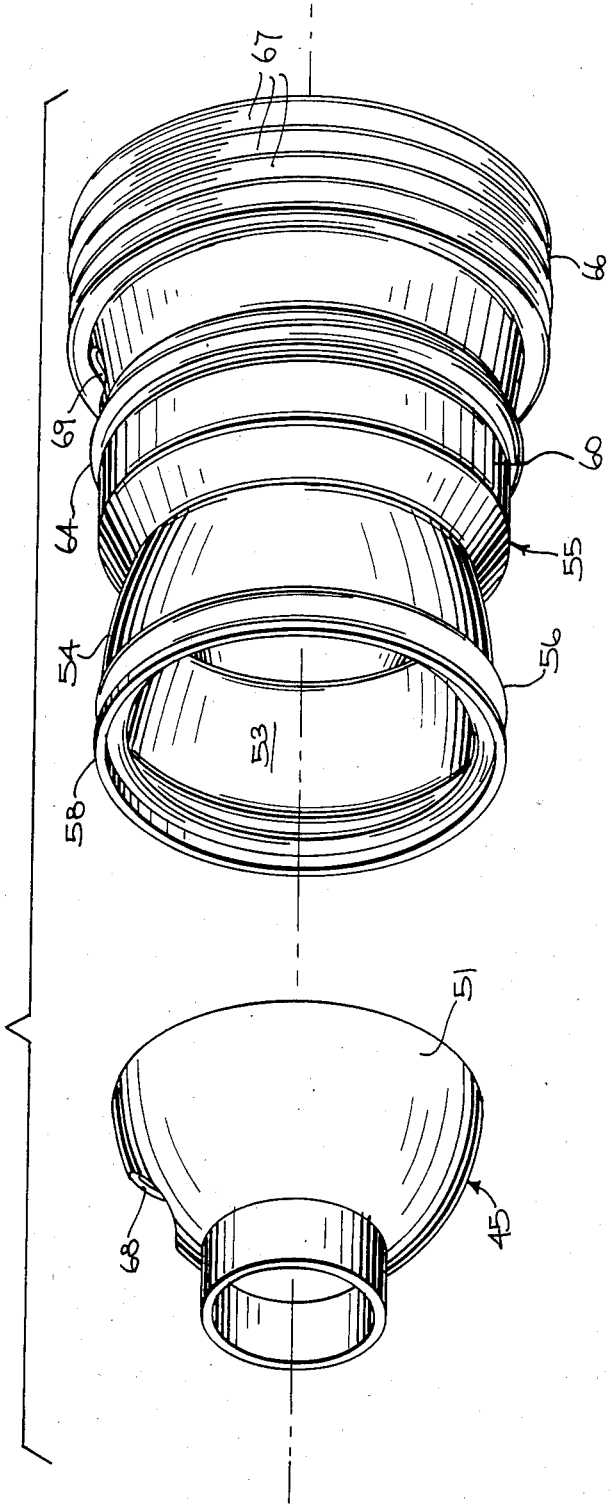
FIG. 2 is an exploded perspective view of the guard of FIG. 1 illustrated alone.
Figure 3:
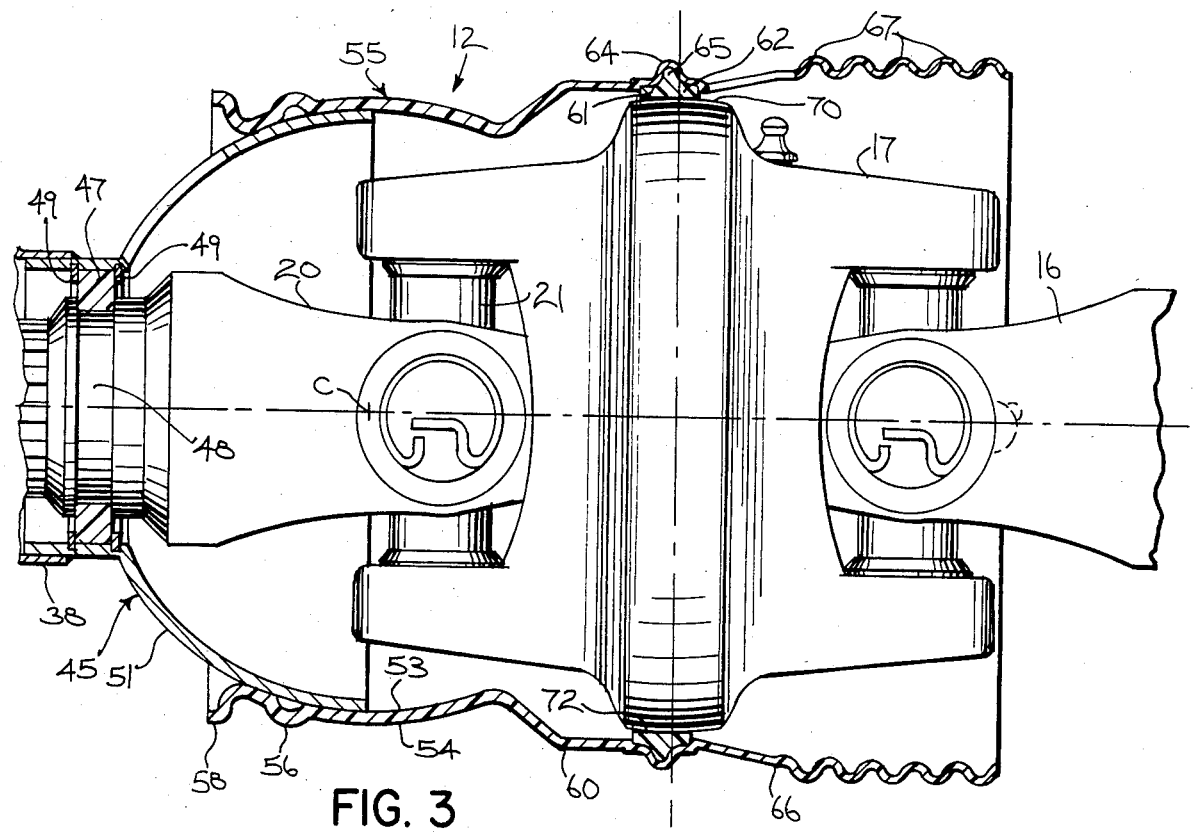
FIG. 3 is a detail plan view partially in section illustrating the guard of FIG. 1 with the longitudinal axes of the universal joint aligned.

As best shown in FIGS. 2 and 3, the bell element 45 opens toward the housing 17 and has a hemispherically shaped outer surface 51. The hemispherical surface 51 mates in sliding contact with the hemispherical inner surface 53 of an end portion 54 of a boot 55. The end portion 54 is also provided with a corrugation 56 and an end lip 58 to provide added strength to the end portion. The boot 55 is preferably molded from a relatively flexible plastic material having good cold weather impact properties such as low or medium density polyethylene.

The hemispherical end portion 54 of the boot 55 is integral with a central portion 60 which defines a circumferential inner groove 61 in which a bearing 62 is disposed. The groove 61 includes a corrugation 64 and the bearing 62 has a rib 65 which extends into the corrugation 64 to help hold the bearing axially within the groove. The bearing 62 can be assembled within the groove 61 by first warming the boot 55 in a warm water bath to slightly expand its diameter. The bearing 62 can then be snapped into place.

An end portion 66 of the boot 55 is integral with the central portion 60 opposite from the end portion 54. The end portion 66 is open and is substantially cylindrical, having a number of corrugations 67 for strength. The end portion 66 extends for the remaining length of the housing 17 to shield the ends of the housing as it rotates. The end portion 66 of the boot 55 should, in any case, extend within the stationary guard provided on the tractor so that the entire drive line is shielded against contact by users. Also, as best shown in FIG. 2, lubrication access openings 68 and 69 can be provided in the bell element 45 and boot 55, respectively.

Figure 4:
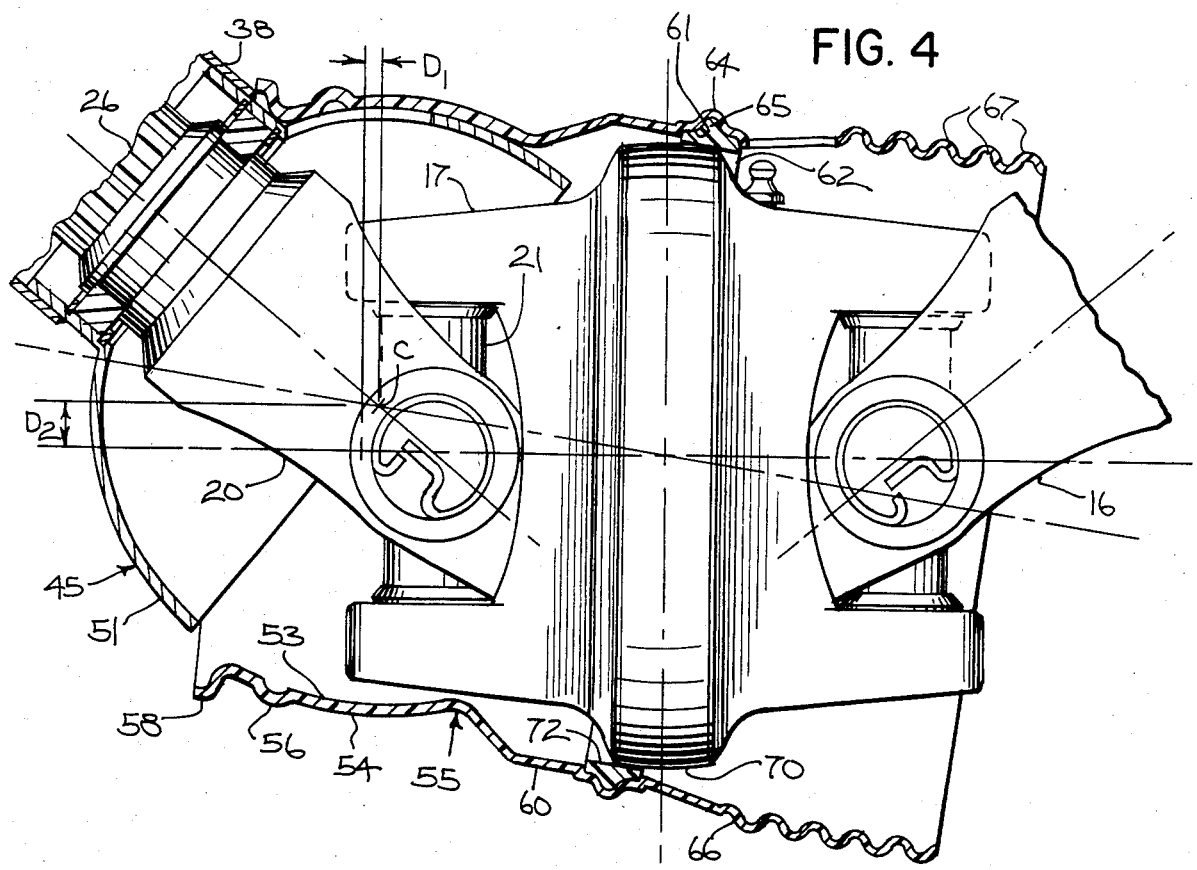
FIG. 4 is a view similar to FIG. 3 but showing the guard with the longitudinal axes of the joint at a wide angle of misalignment.

FIGS. 3 and 4 illustrate that the housing 17 has an outer spherical surface 70 around its circumference on which the bearing 62 slides. The surface 70 is machined spherical and is approximately centered longitudinally with respect to the housing so that the boot tilts approximately about the center of the housing 17. An inner bearing surface 72 of the bearing 62 is cylindrical so that there is line contact between the housing 17 and the bearing 62. As best shown in FIG. 4, the spherical shape of the surface 70 allows the bearing 62 to move along the surface 70 as the yoke 20 is articulated relative to the housing 17. This enables the boot 55 to tilt relative to the housing 17.

The outer spherical surface 51 of the bell element 45 and the inner spherical surface 53 of the boot 55 have a common center C which is spaced a distance outwardly from the intersection of the axes of the cross-link 21 along the axis of the yoke 20. This spacing allows the bell element 45 to have sufficient longitudinal overlap with the boot 55 to secure the boot longitudinally with respect to the bell element and to allow a wide angle of articulation. That is, the overlap between the boot 55 and the bell element 45 keeps the boot 55 from moving longitudinally any substantial distance relative to the housing 17. With a 0.020 inch clearance between the bell element 45 and the boot 55, the boot can only move about a quarter of an inch longitudinally. At the same time, the spacing allows a sufficient clearance between the bell element 45 and the housing 17 to allow a wide angle of articulation.

As the joint and guard shift from the position of FIG. 3 to the position of FIG. 4, the center C shifts a distance $D_1$ longitudinally and $D_2$ radially as it moves from its position shown in FIG. 3 to its position shown in FIG. 4. This shift is also due to the fact that the center C is not on the intersection of the axes of the cross-link 21. Since the boot 55 shifts the same distance $D_1$ longitudinally, the bearing 62 is not centered on the surface 70 but is shifted a distance approximately equal to $D_1$ from the center of the surface 70 toward the bell element 45 when the joint is in its unarticulated position as shown in FIG. 3. The line contact between the bearing surface 72 and the surface 70 allows the boot 55 to shift longitudinally relative to the housing 17.

A guard of the invention can be used for wide angles in limited spaces. Since the boot 55 rides on the housing and rotates about approximately the center of the housing, it is only slightly larger in diameter than the housing 17. Moreover, since the bell element 45 can pivot relative to the boot 55 and the boot can pivot relative to the housing 17, for a 40° angle of articulation between the yoke 20 and the housing 17, the boot 55 only tilts about 10° off the axis of the housing 17. For a double universal joint such as the one shown in the preferred embodiment, a 40° articulation between each yoke 16 and 20 and the housing 17 yields an 80° angle between the yokes. Therefore, for an 80° angle between the yokes 16 and 20, the boot 55 only changes in orientation relative to the housing 17 by about 10°. The result is that the guard 12 does not require very much more space within a tractor's stationary guard than an unguarded universal joint would require. Also, since the guard is comprised of essentially only three major parts, the bell element 45, the boot 55 and the bearing 62, it can be manufactured and assembled easily and inexpensively.

The bearings 47 and 62 of the preferred embodiment are made of a wear resistant plastic material such as that sold under the trade designation Delrin by DuPont or such as nylon. Note that although the bearings 47 and 62 are capable of rotation relative to the yoke 20 and housing 17, respectively, they normally rotate with the yoke 20 and housing 17. Therefore, the bell element 45 and boot 55 rotate relative to the yoke 20 and housing 17 only when necessary, that is, when someone or something contacts the bell element 45 or boot 55. Note that the boot 55 can also rotate, when necessary, relative to the bell element 45.

Numerous modifications and variations to the preferred embodiment will be apparent to those skilled in the art which will still embody the invention. For example, the bearing 62 and boot 55 could be made integral out of a material, such as metal, which has both wear resistant and impact resistant properties. Therefore, the invention is not intended to be defined by the scope of the detailed description or drawings, but by the claims which follow.

I claim:

1. In a double universal joint having first and second yokes pivotally connected by corresponding cross-links to a double inner housing, a guard comprising:

a single bell element having a hemispherically shaped outer surface;

bearing means for mounting the bell element on the first yoke with the bell element opening toward the housing and being axially fixed and rotatable on the first yoke;

a boot for surrounding the housing, the boot having (a) a first end portion with a hemispherically shaped inner surface to mate in sliding contact with the hemispherically shaped outer surface of the bell element so that the bell element is captured inside the boot, (b) a central portion having a bearing surface therein, and (c) a second end portion from said central portion opposite from said first end portion, said second end portion being open; and wherein the housing has a spherical outer surface in sliding contact with the bearing surface to allow the bearing surface and the boot to tilt on the housing as the first yoke is articulated relative to the housing.

2. A guard as in claim 1, wherein the hemispherical surfaces of the bell element and the boot have a common center positioned outward of the intersection of the axis of the adjacent cross-link along the axis of the first yoke, and the bearing surface in the boot is cylindrical to mate in line contact with the spherical surface of the housing so that the bearing surface and the boot can shift longitudinally on the housing as the joint is articulated.

* * * * *